(12) United States Patent
 Tidd

(10) Patent No.: US 9,165,160 B1
(45) Date of Patent: *Oct. 20, 2015

(54) SYSTEM FOR AND METHODS OF CONTROLLING USER ACCESS AND/OR VISIBILITY TO DIRECTORIES AND FILES OF A COMPUTER

(71) Applicant: hopTo Inc., Campbell, CA (US)

(72) Inventor: William Tidd, Alton Bay, NH (US)

(73) Assignee: hopTo Inc., Campbell, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/176,895

(22) Filed: Feb. 10, 2014

Related U.S. Application Data

(63) Continuation of application No. 13/367,239, filed on Feb. 6, 2012, now Pat. No. 8,688,734.

(60) Provisional application No. 61/439,765, filed on Feb. 4, 2011.

(51) Int. Cl.
 *G06F 17/30* (2006.01)
 *G06F 21/62* (2013.01)
(52) U.S. Cl.
 CPC ...... *G06F 21/6218* (2013.01); *G06F 17/30165* (2013.01)
(58) Field of Classification Search
 USPC ................................. 707/694, 783
 See application file for complete search history.

(56) References Cited

U.S. PATENT DOCUMENTS

| | | | |
|---|---|---|---|
| 5,831,609 A | 11/1998 | London et al. | |
| 5,898,419 A | 4/1999 | Liu | |
| 5,978,834 A | 11/1999 | Simonoff et al. | |
| 7,051,288 B2 | 5/2006 | Bennet et al. | |
| 7,188,181 B1 | 3/2007 | Squier et al. | |
| 7,222,158 B2 | 5/2007 | Wexelblat | |
| 7,249,175 B1 | 7/2007 | Donaldson | |
| 7,353,252 B1 | 4/2008 | Yang et al. | |
| 7,461,134 B2 | 12/2008 | Ambrose | |
| 7,526,792 B2 | 4/2009 | Ross | |
| 7,587,459 B2 | 9/2009 | Wewalaarachchi et al. | |
| 7,647,411 B1 | 1/2010 | Schiavone et al. | |
| 7,716,302 B2 | 5/2010 | Maze et al. | |
| 7,739,693 B2 | 6/2010 | Bernhard et al. | |

(Continued)

FOREIGN PATENT DOCUMENTS

WO WO 2010/135127 11/2010

OTHER PUBLICATIONS

U.S. Appl. No. 13/481,743 Office Action mailed Jan. 14, 2015.

(Continued)

*Primary Examiner* — Cam-Linh Nguyen
(74) *Attorney, Agent, or Firm* — Lewis Roca Rothgerber LLP

(57) ABSTRACT

A system includes a file access manager driver and a kernel file system driver stack in a kernel-mode address space of an operating system (OS). The system also includes session processes, a public file whitelist; a public file whitelist manager; a user/group file whitelist, which is a private whitelist; and a user/group file whitelist manager in a user-mode address space of the OS. A method includes receiving a request for access and/or visibility to a directory and/or file and then determining whether the request is allowed to execute based on whether the file access manager driver identifies that the directory and/or file is allowed in either public or private whitelists.

17 Claims, 8 Drawing Sheets

(56) References Cited

U.S. PATENT DOCUMENTS

| | | | |
|---|---|---|---|
| 7,920,528 B2 | 4/2011 | Karaoguz et al. |
| 8,073,855 B2 | 12/2011 | Nagoya |
| 8,219,807 B1 | 7/2012 | Danoyan et al. |
| 8,281,410 B1 | 10/2012 | Sobel et al. |
| 8,427,445 B2 | 4/2013 | Kennedy |
| 8,527,978 B1 | 9/2013 | Sallam |
| 8,688,734 B1 | 4/2014 | Tidd |
| 8,694,507 B2 | 4/2014 | Meyerzon et al. |
| 8,713,658 B1 | 4/2014 | Tidd |
| 8,738,814 B1 | 5/2014 | Cronin |
| 8,856,907 B1 | 10/2014 | Tidd |
| 8,863,232 B1 | 10/2014 | Tidd |
| 8,887,132 B1 | 11/2014 | Hunter |
| 8,950,007 B1* | 2/2015 | Teal et al. | 726/30 |
| 2002/0091697 A1 | 7/2002 | Huang et al. |
| 2002/0158921 A1 | 10/2002 | Silverstein |
| 2003/0163448 A1 | 8/2003 | Kilemba et al. |
| 2004/0080771 A1 | 4/2004 | Mihira et al. |
| 2004/0190049 A1 | 9/2004 | Itoh |
| 2005/0044483 A1 | 2/2005 | Maze et al. |
| 2005/0093868 A1 | 5/2005 | Hinckley |
| 2005/0114760 A1 | 5/2005 | Arregui et al. |
| 2005/0149857 A1 | 7/2005 | Negishi et al. |
| 2005/0177730 A1 | 8/2005 | Davenport et al. |
| 2005/0198299 A1 | 9/2005 | Beck et al. |
| 2005/0210418 A1 | 9/2005 | Marvit et al. |
| 2006/0047780 A1 | 3/2006 | Patnude |
| 2006/0075224 A1 | 4/2006 | Tao |
| 2006/0150256 A1 | 7/2006 | Fanton et al. |
| 2006/0253558 A1 | 11/2006 | Acree et al. |
| 2007/0061264 A1 | 3/2007 | Yeung et al. |
| 2007/0078994 A1 | 4/2007 | Wilson et al. |
| 2007/0113187 A1 | 5/2007 | McMullen et al. |
| 2007/0121584 A1 | 5/2007 | Qiu et al. |
| 2007/0280459 A1 | 12/2007 | Yee et al. |
| 2007/0283446 A1 | 12/2007 | Yami et al. |
| 2008/0016504 A1 | 1/2008 | Cheng et al. |
| 2008/0071860 A1 | 3/2008 | Dal Canto et al. |
| 2008/0137131 A1 | 6/2008 | Cavill et al. |
| 2008/0167005 A1 | 7/2008 | Gilzean et al. |
| 2008/0209537 A1 | 8/2008 | Wong et al. |
| 2008/0270516 A1 | 10/2008 | Ragnet et al. |
| 2009/0013045 A1 | 1/2009 | Maes et al. |
| 2009/0021387 A1 | 1/2009 | Hosono |
| 2009/0024626 A1 | 1/2009 | Takei |
| 2009/0027334 A1 | 1/2009 | Foulk et al. |
| 2009/0037976 A1 | 2/2009 | Teo et al. |
| 2009/0070404 A1 | 3/2009 | Mazzaferri |
| 2009/0083852 A1 | 3/2009 | Kuo et al. |
| 2009/0132509 A1 | 5/2009 | Nagoya |
| 2009/0177791 A1 | 7/2009 | Edelstein et al. |
| 2009/0180777 A1 | 7/2009 | Bernard et al. |
| 2009/0204711 A1 | 8/2009 | Binyamin |
| 2009/0235347 A1 | 9/2009 | Syed et al. |
| 2009/0245176 A1 | 10/2009 | Balasubramanian et al. |
| 2009/0300129 A1 | 12/2009 | Golub |
| 2010/0020025 A1 | 1/2010 | Lemort et al. |
| 2010/0058431 A1 | 3/2010 | McCorkendale et al. |
| 2010/0138780 A1 | 6/2010 | Marano et al. |
| 2010/0153581 A1 | 6/2010 | Nagarajan et al. |
| 2010/0162163 A1 | 6/2010 | Wang et al. |
| 2010/0228963 A1 | 9/2010 | Kassab et al. |
| 2010/0269152 A1 | 10/2010 | Pahlavan et al. |
| 2010/0293499 A1 | 11/2010 | Young et al. |
| 2010/0295817 A1 | 11/2010 | Nicholson et al. |
| 2010/0325716 A1 | 12/2010 | Hong et al. |
| 2011/0029772 A1 | 2/2011 | Fanton et al. |
| 2011/0137974 A1 | 6/2011 | Momchilov |
| 2011/0138295 A1 | 6/2011 | Momchilov et al. |
| 2011/0138314 A1 | 6/2011 | Mir et al. |
| 2011/0141031 A1 | 6/2011 | McCullough et al. |
| 2011/0154212 A1 | 6/2011 | Gharpure et al. |
| 2011/0191407 A1 | 8/2011 | Fu et al. |
| 2011/0197051 A1 | 8/2011 | Mullin et al. |
| 2011/0209064 A1 | 8/2011 | Jorgensen et al. |
| 2011/0258271 A1 | 10/2011 | Gaquin |
| 2011/0270936 A1 | 11/2011 | Guthrie et al. |
| 2011/0277027 A1 | 11/2011 | Hayton et al. |
| 2011/0279829 A1 | 11/2011 | Chang et al. |
| 2011/0302495 A1 | 12/2011 | Pinto et al. |
| 2011/0307614 A1 | 12/2011 | Bernardi et al. |
| 2011/0314093 A1 | 12/2011 | Sheu et al. |
| 2012/0011578 A1 | 1/2012 | Hinton et al. |
| 2012/0023593 A1 | 1/2012 | Puder et al. |
| 2012/0054671 A1 | 3/2012 | Thompson et al. |
| 2012/0066695 A1 | 3/2012 | Berezansky et al. |
| 2012/0066762 A1* | 3/2012 | Todorovic | 726/22 |
| 2012/0084713 A1 | 4/2012 | Desai et al. |
| 2012/0092277 A1 | 4/2012 | Momchilov |
| 2012/0096389 A1 | 4/2012 | Flam et al. |
| 2012/0159570 A1 | 6/2012 | Reierson et al. |
| 2012/0173673 A1 | 7/2012 | Dietrich et al. |
| 2012/0185527 A1 | 7/2012 | Jaudon et al. |
| 2012/0185767 A1 | 7/2012 | Schlegel |
| 2012/0226742 A1 | 9/2012 | Momchilov et al. |
| 2012/0246645 A1 | 9/2012 | Iikura et al. |
| 2012/0297471 A1 | 11/2012 | Smithson |
| 2012/0304168 A1 | 11/2012 | Raj Seeniraj et al. |
| 2012/0311070 A1 | 12/2012 | BianRosa et al. |
| 2012/0324365 A1 | 12/2012 | Momchilov et al. |
| 2013/0060842 A1 | 3/2013 | Grossman |
| 2013/0097550 A1 | 4/2013 | Grossman et al. |
| 2013/0110828 A1 | 5/2013 | Meyerzon et al. |
| 2013/0198600 A1 | 8/2013 | Lockhart et al. |
| 2013/0254675 A1 | 9/2013 | de Andrade et al. |
| 2013/0254761 A1 | 9/2013 | Reddy et al. |
| 2013/0290856 A1 | 10/2013 | Beveridge et al. |
| 2013/0305344 A1 | 11/2013 | Alicherry et al. |
| 2013/0318582 A1 | 11/2013 | McCann et al. |
| 2013/0326583 A1 | 12/2013 | Freihold et al. |
| 2014/0012574 A1 | 1/2014 | Pasupalak et al. |
| 2014/0026057 A1 | 1/2014 | Kimpton et al. |
| 2014/0074881 A1 | 3/2014 | Meyerzon et al. |
| 2014/0143846 A1 | 5/2014 | Tidd |
| 2014/0143847 A1 | 5/2014 | Tidd |
| 2015/0074199 A1 | 3/2015 | LV |

OTHER PUBLICATIONS

U.S. Appl. No. 13/367,228 Final Office Action mailed Jul. 23, 2013.
U.S. Appl. No. 13/367,228 Office Action mailed Jan. 30, 2013.
U.S. Appl. No. 13/367,239 Final Office Action mailed Nov. 14, 2013.
U.S. Appl. No. 13/367,239 Office Action mailed Jun. 24, 2013.
U.S. Appl. No. 13/481,742 Final Office Action mailed Sep. 4, 2013.
U.S. Appl. No. 13/481,742 Office Action mailed May 9, 2013.
U.S. Appl. No. 13/481,746 Office Action mailed Dec. 19, 2013.
U.S. Appl. No. 13/481,751 Office Action mailed Dec. 30, 2013.
U.S. Appl. No. 13/481,752 Final Office Action mailed Sep. 4, 2013.
U.S. Appl. No. 13/481,752 Office Action mailed May 9, 2013.
U.S. Appl. No. 13/753,474 Final Office Action mailed Mar. 6, 2014.
U.S. Appl. No. 13/753,474 Office Action mailed Nov. 21, 2013.
U.S. Appl. No. 13/570,106 Office Action mailed Feb. 27, 2014.
U.S. Appl. No. 13/570,115 Office Action mailed Feb. 11, 2014.
U.S. Appl. No. 13/367,228, filed Feb. 6, 2012, William Tidd, Systems for and Methods of Controlling User Access to Applications and/or Programs of a Computer.
U.S. Appl. No. 13/481,742, filed May 25, 2012, William Tidd, System for and Method of Providing Single Sign-On (SSO) Capability in an Application Publishing Environment.
U.S. Appl. No. 14/150,680, filed Jan. 8, 2014, William Tidd, System for and Method of Providing Single Sign-On (SSO) Capability in an Application Publishing Environment.
U.S. Appl. No. 14/150,684, filed Jan. 8, 2014, William Tidd, System for and Method of Providing Single Sign-On (SSO) Capability in an Application Publishing Environment.
U.S. Appl. No. 14/151,222, filed Jan. 9, 2014, William Tidd, System for a Method of Providing Single Sign-On (SSO) Capability in an Application Publishing Environment.
U.S. Appl. No. 14/152,303, filed Jan. 10, 2014, William Tidd, System for and Method of Providing Single Sign-On (SSO) Capability in an Application Publishing Environment.

(56) References Cited

OTHER PUBLICATIONS

U.S. Appl. No. 14/152,306, filed Jan. 10, 2014, William Tidd, System for and Method of Providing Single Sign-On (SSO) Capability in an Application Publishing Environment.
U.S. Appl. No. 13/481,743, filed May 25, 2012, William Tidd, System for and Method of Providing a Document Sharing Service in Combination With Remote Access to Document Applications.
U.S. Appl. No. 13/481,745, filed May 25, 2012, William Tidd, System for and Method of Providing a Document Sharing Service in Combination With Remote Access to Document Applications.
U.S. Appl. No. 13/481,746, filed May 25, 2012, William Tidd, System for and Method of Providing a Document Sharing Service in Combination With Remote Access to Document Applications.
U.S. Appl. No. 13/481,751, filed May 25, 2012, John Cronin, System for and Method of Processing User Interface Graphics Between a Client Device and an Application Host Computer.
U.S. Appl. No. 13/481,752, filed May 25, 2012, William Tidd, System for and Methods of Providing Single Sign-On (SSO) Capability in an Application Publishing and/or Document Sharing Environment.
U.S. Appl. No. 13/753,474, filed Jan. 29, 2013, Robert W. Currey, System for and Methods of Translating Accelerometer Information to Mouse-Based I/O Commands in a Remote Access Application Publishing Environment.
U.S. Appl. No. 13/753,475, filed Jan. 29, 2013, Robert W. Currey, System for and Method of Cross-Platform User Notification in an Application Publishing Environment.
U.S. Appl. No. 13/753,476, filed Jan. 29, 2013, Robert W. Currey, System for and Method of Cross-Platform User Notification in an Application Publishing Environment.
U.S. Appl. No. 13/753,477, filed Jan. 29, 2013, Robert W. Currey, System for and Method of Rendering Remote Applications on a Client Device in an Application Publishing Environment.
U.S. Appl. No. 13/753,478, filed Jan. 29, 2013, Robert W. Currey, System for and Method of Rendering Remote Applications on a Client Device in an Application Publishing Environment.
U.S. Appl. No. 13/753,479, filed Jan. 29, 2013, Robert W. Currey, System for and Method of Rendering Remote Applications on a Client Device in an Application Publishing Environment.
U.S. Appl. No. 13/570,103, filed Aug. 8, 2012, Christoph Berlin, System for and Method of Providing a Universal I/O Command Translation Framework in an Application Publishing Environment.
U.S. Appl. No. 13/570,106, filed Aug. 8, 2012, Christoph Berlin, System for and Method of Providing a Universal I/O Command Translation Framework in an Application Publishing Environment.
U.S. Appl. No. 13/570,108, filed Aug. 8, 2012, Christoph Berlin, System for and Method of Providing a Universal I/O Command Translation Framework in an Application Publishing Environment.
U.S. Appl. No. 13/570,110, filed Aug. 8, 2012, Christoph Berlin, System for and Method of Providing Alternating Desktop Views on a Client Device in an Application Publishing Environment.
U.S. Appl. No. 13/570,111, filed Aug. 8, 2012, Christoph Berlin, System for and Method of Providing Alternating Desktop Views on a Client Device in an Application Publishing Environment.
U.S. Appl. No. 13/570,113, filed Aug. 8, 2012, Christoph Berlin, System for and Method of Providing Alternating Desktop Views on a Client Device in a Cloud-Based Application Publishing Environment.
U.S. Appl. No. 13/570,115, filed Aug. 8, 2012, Christoph Berlin, System for and Method of Providing Alternating Desktop Views on a Client Device in a Cloud-Based Application Publishing Environment.
U.S. Appl. No. 13/668,097, filed Nov. 2, 2012, William Tidd, System for and Methods of Providing Bidirectional Communication Between a Web Application and an Application Hosted in an Application Publishing Environment.
U.S. Appl. No. 13/668,100, filed Nov. 2, 2012, William Tidd, Client Computing System in a Client-Server Computing Environment for Providing Bidirectional Communication Between a Web Application and a Hosted Application.
U.S. Appl. No. 14/332,660 Office Action mailed Mar. 27, 2015.
U.S. Appl. No. 13/481,745 Office Action mailed Feb. 10, 2015.
U.S. Appl. No. 13/753,474 Office Action mailed Mar. 27, 2015.
U.S. Appl. No. 13/570,108 Office Action mailed Apr. 1, 2015.
U.S. Appl. No. 13/570,110 Office Action mailed Mar. 30, 2015.
U.S. Appl. No. 13/570,111 Office Action mailed Apr. 1, 2015.
U.S. Appl. No. 13/570,113 Office Action mailed Apr. 3, 2015.
U.S. Appl. No. 13/481,746 Final Office Action mailed Mar. 26, 2014.
U.S. Appl. No. 13/570,108 Office Action mailed May 13, 2014.
U.S. Appl. No. 13/753,475 Office Action mailed Apr. 24, 2015.
U.S. Appl. No. 13/753,476 Office Action mailed Apr. 22, 2015.
U.S. Appl. No. 13/570,103 Office Action mailed Apr. 24, 2015.
U.S. Appl. No. 13/570,115 Office Action mailed Jun. 19, 2015.
U.S. Appl. No. 13/668,097 Final Office Action mailed Jun. 16, 2015.
U.S. Appl. No. 13/668,100 Final Office Action mailed Jun. 17, 2015.
Park et al.; "Role-based access control on the web"; ACM transactions on information and system security; vol. 4, No. 1, Feb. 2001. p. 37-71, 35 pages.
U.S. Appl. No. 13/753,474 Office Action mailed Jun. 11, 2014.
U.S. Appl. No. 13/570,115 Final Office Action mailed Jun. 30, 2014.
U.S. Appl. No. 14/332,660, filed Jul. 16, 2014, William Tidd, System for and Methods of Controlling User Access to Applications and/or Programs of a Computer.
U.S. Appl. No. 14/445,319, filed Jul. 29, 2014, William Tidd, System for and Methods of Providing Single Sign-On (SSO) Capability in an Application Publishing and/or Document Sharing Environment.
U.S. Appl. No. 13/481,751 Final Office Action mailed Sep. 3, 2014.
U.S. Appl. No. 13/753,474 Final Office Action mailed Oct. 6, 2014.
U.S. Appl. No. 13/570,106 Final Office Action mailed Sep. 15, 2014.
U.S. Appl. No. 13/570,108 Office Action mailed Oct. 10, 2014.
U.S. Appl. No. 13/668,097 Office Action mailed Sep. 12, 2014.
U.S. Appl. No. 13/668,100 Office Action mailed Sep. 10, 2014.
U.S. Appl. No. 13/753,477 Office Action mailed Jul. 29, 2015.
U.S. Appl. No. 13/753,478 Office Action mailed Aug. 19, 2015.
U.S. Appl. No. 13/753,479 Office Action mailed Aug. 12, 2015.
U.S. Appl. No. 13/668,105 Office Action mailed Jul. 8, 2015.

* cited by examiner

SYSTEM FOR AND METHODS OF CONTROLLING USER ACCESS AND/OR VISIBILITY TO DIRECTORIES AND FILES OF A COMPUTER

CROSS-REFERENCE TO RELATED APPLICATIONS

The present application is a continuation and claims the priority benefit of U.S. patent application Ser. No. 13/367,239 filed Feb. 6, 2012, which claims the priority benefit of U.S. provisional application No. 61/439,765 filed Feb. 4, 2011, the disclosures of which are incorporated herein by reference.

BACKGROUND OF THE INVENTION

1. Field of the Invention

Various inventive embodiments disclosed herein relate generally to computer security applications. In particular, embodiments disclosed herein relate to a system for and methods of controlling user access and/or visibility to directories and files of a computer.

2. Description of the Related Art

In a shared computing environment, multiple users are accessing a common computer, such as a server, either directly or remotely via a network connection. Often in a shared computing environment most of the computer's files, programs, processes, and resources may be accessed or browsed by the users. However, certain files, programs, processes, and resources may be sensitive in nature and it may be desired to restrict users' access. Therefore, security measures are implemented on shared computers that attempt to provide isolation between users and thereby prevent one user from accessing another user's data and/or from performing any unauthorized actions. Currently, computer operating systems provide security features by which an administrator of a shared computer may configure each user (i.e., grant permissions or specify restrictions). However, there can be a great deal of complexity associated with using these security features. Therefore, the process of configuring the security settings of multiple users may be very difficult and time consuming.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

Figure 1:
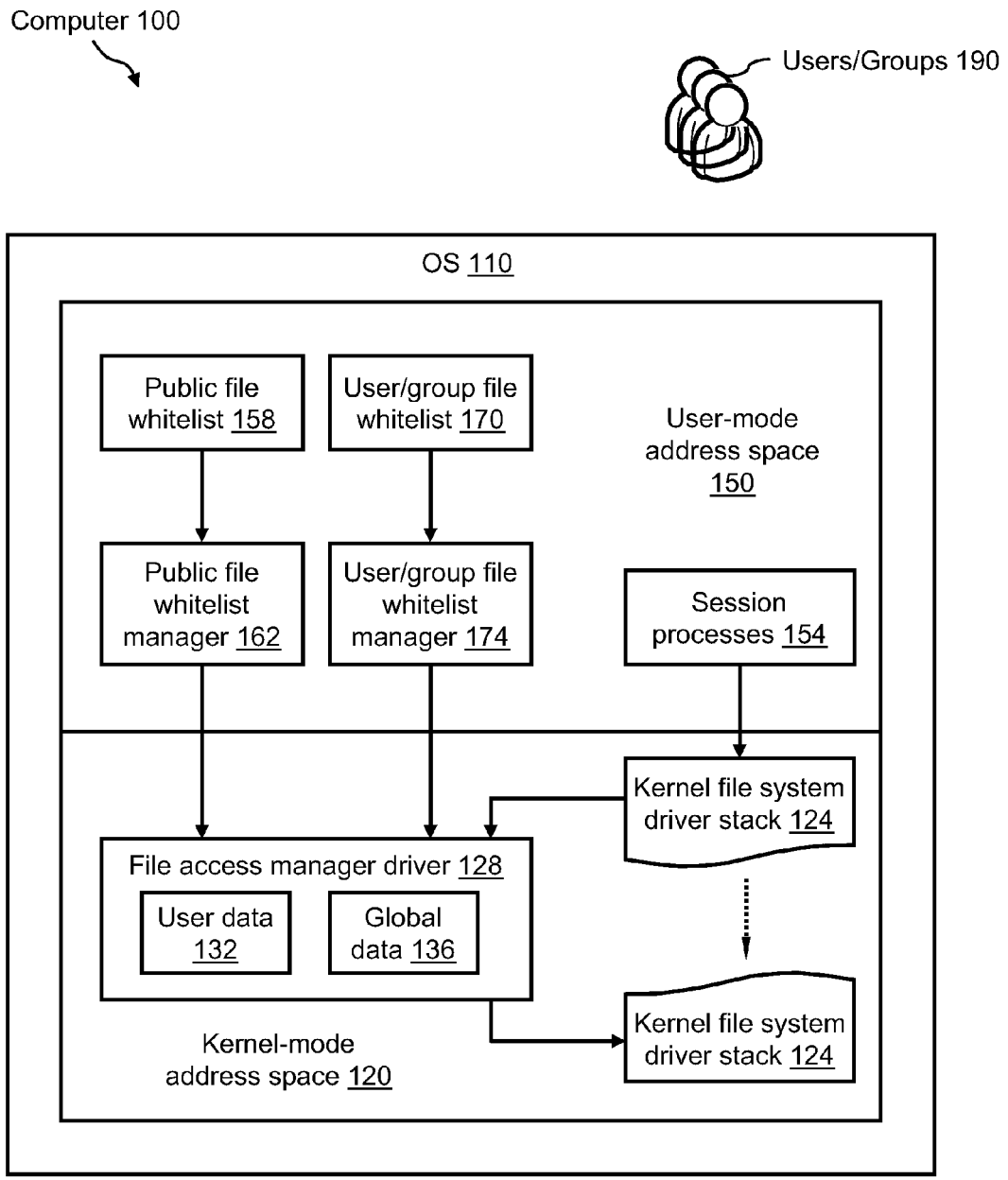
FIG. 1 illustrates a block diagram of a computer that includes security features for controlling user access and/or visibility to directories and files, according to the present disclosure.

The disclosure provides a system with improved security features for controlling user access and/or visibility to directories and files, and more particularly to limiting or restricting user or group access and/or visibility to directories and files of a computer. The system of the invention exhibits numerous advantages over existing systems. In various embodiments, the system and associated methods may provide a simple process by which an administrator may specify a list of allowable directories and files. Further, in some embodiments, the system of the invention may be configured such that a data structure of allowable directories and files are more readily available to an operating system kernel module. The system and methods of the invention provide isolation between different users and sessions, such that one user accessing a shared computer cannot access another user's data and/or perform any unauthorized actions.

This disclosure may relate to application publishing. The functionality of a server application shall be visible to and accessible by a client via a network. For example, server application may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application such as Symbia.net (Siemens AG, Munich, Germany); an interactive mapping application such as Google Earth (Google, Inc.) or a 3D game. The functionality of the server application shall be visible to and accessible by the client via a network. For example, the functionality of a server application may be accessed from a client using a process herein known as application publishing, which is currently supported by products such as GraphOn GO-Global, Microsoft Remote Desktop Services and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

Further, the system and methods of the invention may be used to restrict or limit the computer file trees that are accessible and/or viewable by a user. For example, the invention allows users to run applications while at the same time restricts or limits users from freely browsing the hard drive system of a shared computer. In summary, aspects of the invention include (1) directory and/or file access restrictions and (2) directory and/or file visibility restrictions.

There is as difference between allowing visibility to a set of folders and allowing access to the data or files within the folders. An aspect of the invention is that it may be used to restrict users from viewing, for example, folders that contain applications, but at the same time allow users to run the processes that may be contained in those directories. In one example, the invention may be used to block a wildcard search of the Windows System32 directory, while at the same time allow users to run the processes (e.g., User32.dll) in the Windows System32 directory.

FIG. 1 illustrates a block diagram of a computer 100 that includes security features for controlling user access and/or visibility to directories and files, and more particularly to limiting or restricting user or group access and/or visibility to directories and files of computer 100. Computer 100 includes an operating system (OS) 110 such as Windows® (Microsoft Corporation, Redmond, Wash., USA) or Linux. OS 110 segregates virtual memory into a kernel-mode address space 120 (i.e., kernel space) and a user-mode address space 150 (i.e., user space). In general terms, kernel space is reserved for running an OS kernel, kernel extensions, and most device drivers. In contrast, user space is the memory area in which user mode applications operate.

Although not explicitly shown in FIG. 1, those skilled in the art will recognize that computer 100 includes other components, such as input/output devices (e.g., mouse, keyboard, display, touch screen), primary and/or secondary storage medium or memory, a central processing unit (CPU), a communications bus, a network connection, and the like. Additionally, computer 100 may be accessed by one or more users/groups 190. In one example, computer 100 may be a host computer or centralized server that users/groups 190 may access remotely via a network (not shown). In other example, computer 100 may be a shared public computer that is accessed directly by one or more users/groups 190. In yet another example, computer 100 may be accessed either directly or via a remote connection. In any case, users/groups 190 may be granted access to computer 100 using a login and authentication process.

Kernel-mode address space 120 includes a kernel file system driver stack 124 and a file access manager driver 128. Kernel file system driver stack 124 is a chain of one or more drivers that receive IO requests. File access manager driver 128 may be implemented in the form of a kernel dynamic link library (DLL) or driver. Kernel file system driver stack 124 communicates with file access manager driver 128.

User-mode address space 150 includes any number of session processes 154; a public file whitelist 158; a public file whitelist manager 162; a user/group file whitelist 170, which is a private whitelist; and a user/group file whitelist manager 174. Public file whitelist 158 and user/group file whitelist 170 are maintained in any data storage medium (not shown) of computer 100. The communication path between session processes 154 and kernel file system driver stack 124 signifies that each parent process is capable of passing process directory and/or file information (e.g., the name of the process, directory, or file; or file path) to kernel file system driver stack 124 during operation. The communication paths from user/group file whitelist 170 to user/group file whitelist manager 174 and from public file whitelist 158 to public file whitelist manager 162 signify that both whitelists can be read from storage and information therein can be provided to file access manager driver 128 during operation.

A session process 154 is any application and/or program that is started in a user's session and attempts to access a directory or file. For example, the access request may be user-driven via a file open dialog or by internal processes of an application that is running. When one of session processes 154 attempts to access a certain directory or file on computer 100, the request is communicated to file access manager driver 128 through kernel-mode address space 120, and more particularly through kernel file system driver stack 124.

The file access manager driver 128 is part of kernel file system driver stack 124. More specifically, file access manager driver 128 is a filter driver within kernel file system driver stack 124. Computer OSs allow filter drivers to be installed within the file system driver stack. Filter drivers receive requests from upstream file drivers in the stack and then process the requests and pass them to the next downstream file driver in the stack. Generally, a file system filter driver intercepts requests targeted at a file system or another file system filter driver. By intercepting the request before it reaches its intended target, the filter driver can extend or replace functionality provided by the original target of the request. Examples of file system filter drivers include anti-virus filters, backup agents, and encryption products.

Accordingly, file access manager driver 128, which is a filter driver, receives notification of a directory or file access request via kernel file system driver stack 124. File access manager driver 128 processes the access request and either allows the request to be passed down through the kernel file system driver stack 124 or denies the request and returns a failure. In this way, as access to a certain directory or file is requested, file access manager driver 128 performs a file filtering function according to the invention. More particularly, file access manager driver 128 is used to enforce access-restrictions and visibility-restrictions on directories and files of computer 100.

Public file whitelist 158 is a resource (e.g., a file or files) for storing a list of directories and files of computer 100 that may be accessed by all users/groups 190. Such a resource is referred to in the art as a centralized whitelist. The contents of public file whitelist 158 are set up by an administrator.

Public file whitelist manager 162 starts when computer 100 boots up. Public file whitelist manager 162 is responsible for communicating public file whitelist 158 to file access manager driver 128 to be stored in global memory 136 that can be accessed from any process. Public file whitelist manager 162 reads public file whitelist 158 from storage, adds to the whitelist any directories that an administrator has published to all users/groups 190, and then sends public file whitelist 158 to file access manager driver 128. As such, the act of publishing a directory automatically grants all users/groups 190 rights to that directory.

User/group file whitelist 170 is a resource (e.g., a file or files) for storing a list of allowed directories and files of computer 100 for each individual user or group 190. User/group file whitelist 170 may include an association between directories and files and users or groups 190. It is further expressly contemplated that user/group file whitelist 170 may instead be a blacklist; that is, a resource storing only those directories and files that are not allowed to be accessed or viewed by a user/group 190. The contents of user/group file whitelist 170 are set up by an administrator. The administrator may make manual entries to user/group file whitelist 170 and/or automatically enable a user to access directories and files that an administrator has published to a user or group 190 (e.g., directories and files that are referenced by shortcuts included in the user's profile).

User/group file whitelist manager 174 may be the program that manages initialization of the user's environment. User/group file whitelist manager 174 loads user/group file whitelist 170 from storage, adds to the whitelist directories that are published to the user (or groups to which the user belongs), and sends user/group file whitelist 170 to file access manager driver 128 to be stored in user data 132. Public file whitelist 158 can be edited by public file whitelist manager 162 or by the logon process at user/group file whitelist manager 174. By contrast, the user/group file whitelist 170 can only be edited by the logon process at user/group file whitelist manager 174. For the purposes of the invention, public file whitelist manager 162 and user/group file whitelist manager 174 may be implemented as separate processes or as a single process.

Figure 2:
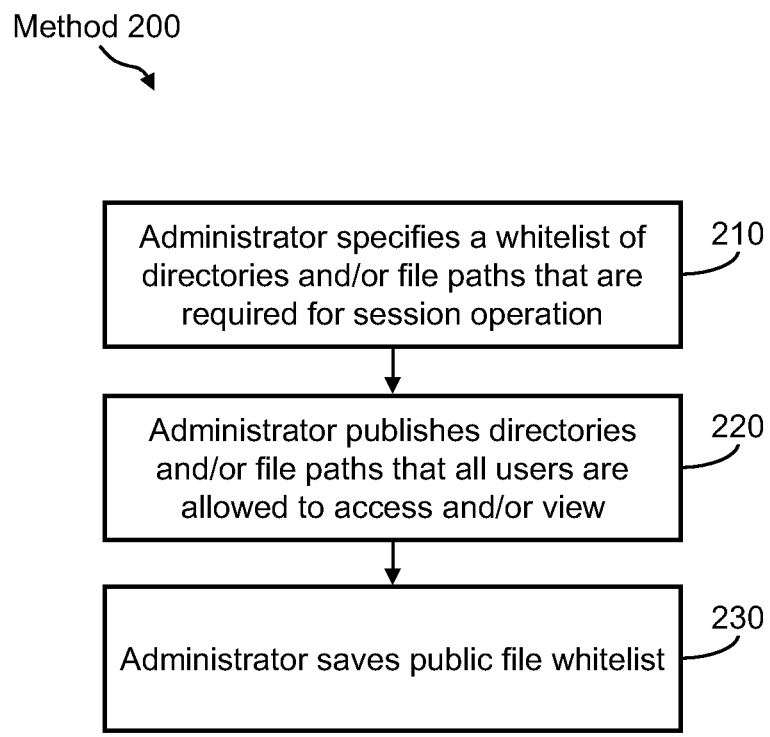
FIG. 2 illustrates a flow diagram of a method of defining public access and/or visibility to computer directories and files, according to the present disclosure.

FIG. 2 illustrates a flow diagram of a method 200 of defining public access and/or visibility to directories and files of computer 100, and more particularly of defining public file whitelist 158. Method 200 may include, but is not limited to, the following steps.

At step 210, an administrator (or other user with similar rights) uses an input device (not shown) of computer 100 to enter information regarding directories and files that are required for all users/groups 190 to access computer 100. An example of one such file on a Microsoft Windows machine is user32.dll.

At step 220, the administrator uses an input device (not shown) of computer 100 to enter information regarding directories and files that may be invoked by all users/groups 190 of computer 100. That is, in the process of configuring computer 100, the administrator publishes a set of directories and file paths to all users/groups 190. An example of one such directory is the Public Documents directory on a Windows 7 computer. The act of publishing a directory or file path to all users/groups 190 automatically grants all users/groups 190 rights to that directory or file path, as described in step 440 of method 400 of FIG. 4.

Step 220 provides a benefit over conventional systems in which there is no connection between the process of publishing directories and files to a user and restricting the user from accessing and/or viewing directories and files that are not published. For example, administrators can publish directories and files to users on Windows computers using Group Policy Preferences and grant/deny users access and/or visibility to directories and files using Group Policy. With these methods, however, administrators must publish the directories and files and then separately perform manual steps to grant the user rights to the published directories and files and restrict the user from accessing and/or viewing directories and files that are not published. In step 220, administrators must only publish the directories and files; the system then automatically grants the user access to the published directories and files and denies the user access to all other directories and files that are not in public file whitelist 158.

At step 230, the administrator saves the set of directories and files defined at step 210 in the form of public file whitelist 158 to storage medium (not shown) of computer 100. Optionally, the administrator may also save the list of published directories and files defined at step 220 in public file whitelist 158 to storage medium of computer 100, but in order to avoid data duplication, published directories and files are typically added to public file whitelist 158 at step 440 of method 400 of FIG. 4. In one example, public file whitelist 158 is stored as an XML file in a default system directory to which all users are granted read access but only administrators are granted write access.

Figure 3:
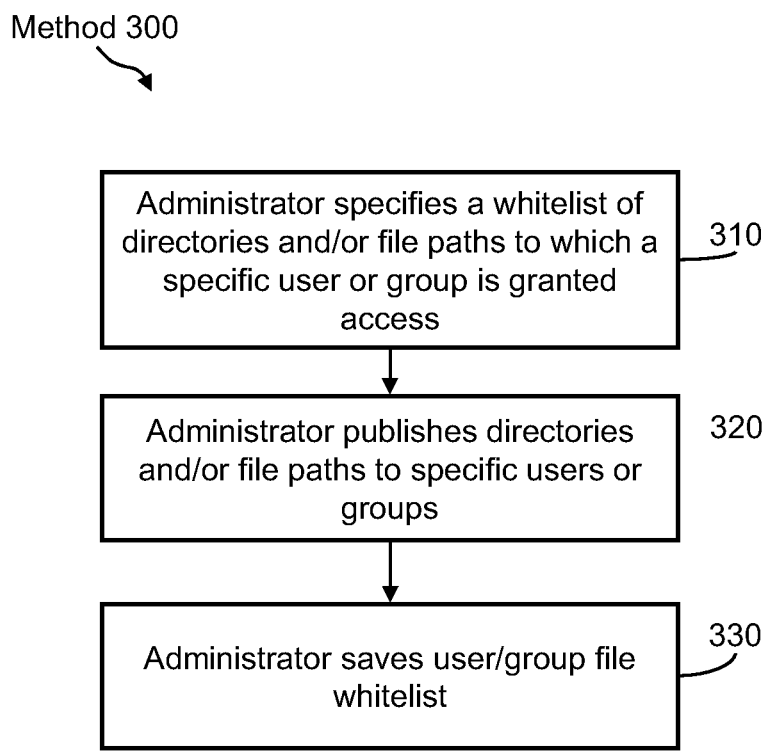
FIG. 3 illustrates a flow diagram of a method of defining user-specific and group-specific access and/or visibility to computer directories and files, according to the present disclosure.

FIG. 3 illustrates a flow diagram of a method 300 of defining user-specific and group-specific access and/or visibility to directories and files of computer 100, and more particularly of defining user/group file whitelist 170. Method 300 may include, but is not limited to, the following steps.

At step 310, an administrator (or other user with similar rights) uses an input device (not shown) of computer 100 to enter information regarding the directories and files of computer 100 that specific users or groups are allowed to access. In one example, the administrator generates a user-specific or group-specific whitelist for each user or group 190. In another example, the administrator generates one whitelist in which each program entry includes a list of the users and groups 190 that are allowed to access the directories and files.

At step 320, which may be in addition to or in place of step 310, the administrator publishes directories and files to specific users or groups 190. For example, on a Windows computer, an administrator may publish a directory of shared documents to a specific group of users using Group Policy Preferences. Like step 220 of method 200 of FIG. 2, the act of publishing the directory and/or file automatically grants specific users 190 and/or specific groups 190 rights to that directory and/or file. As such, step 320 provides a benefit over conventional systems in which there is no connection between the process of publishing directories and files to a user or group and automatically granting the user of group rights to access or view the directories and files. This process is managed by user/group file whitelist manager 174 at step 530 of method 500 of FIG. 5. Again, current methods use group policy to enforce assess and visibility restrictions, in which an administrator must publish the directories and files and then separately perform manual steps to grant the user rights to certain directories and files and/or to restrict the user from access and/or viewing directories and files.

In one example, the administrator specifies an allowable file path and executable name. In another example, an allowable directory can be specified and all subdirectories and files of the directory can be considered allowable.

At step 330, the administrator saves the allowable directories and files in the form of user/group file whitelist 170 to storage medium (not shown) of computer 100. In one example, each user/group file whitelist 170 is stored in an XML file in a user-specific or group-specific directory. Further, this file or directory can have read-only access properties for users or groups 190. The properties are enforced by OS 110 and prevent unauthorized modifications of user allowable directories and files.

Figure 4:
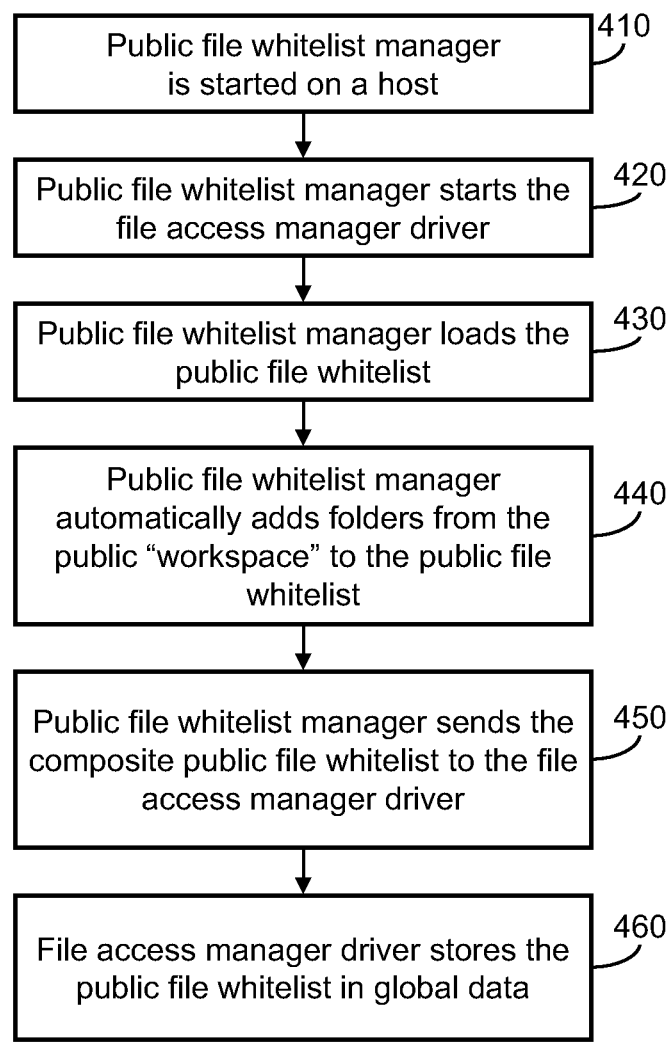
FIG. 4 illustrates a flow diagram of a method of initializing public access and/or visibility to computer directories and files, according to the present disclosure.

FIG. 4 illustrates a flow diagram of a method 400 of initializing public access and/or visibility to directories and files of computer 100, and more particularly of passing public file whitelist 158 to file access manager driver 128. Method 400 may include, but is not limited to, the following steps.

At step 410, public file whitelist manager 162 is started on computer 100. In one example, public file whitelist manager 162 is started during the startup process of OS 110. Note that startup typically occurs prior to user authentication.

At step 420, public file whitelist manager 162 loads and initializes file access manager driver 128 if file access manager driver 128 is not already running (e.g., if file access manager driver 128 is not configured to load when OS 110 boots).

At step 430, public file whitelist manager 162 loads public file whitelist 158 from storage medium (not shown) into primary memory (not shown) of computer 100.

At step 440, based on files that are published in step 220 of method 200 of FIG. 2, public file whitelist manager 162 automatically adds folders from the public "workspace" that are published to all users to the contents of public file whitelist 158. For example, on Windows computers, the list of published folders may be obtained by searching directories within the computer's Public Documents directory.

At step 450, public file whitelist manager 162 transmits the composite public file whitelist 158 to file access manager driver 128. In so doing, the list of public allowable directories and files crosses over from user-mode address space 150 to kernel-mode address space 120.

At step 460, file access manager driver 128 stores public file whitelist 158 in global data 136 of file access manager driver 128.

The benefits of performing method 400 of FIG. 4 include (1) bringing public file whitelist 158 into kernel space, where it may be accessed with high efficiency during user-specific directory access and/or file access enforcement methods (2) bringing public file whitelist 158 into kernel space, where it may be accessed with high efficiency during user-specific directory visibility and/or file visibility enforcement methods and (3) creating a communication path from kernel file system driver stack 124 to file access manager driver 128 that can be used to enforce the restrictions defined in public file whitelist 158.

Figure 5:
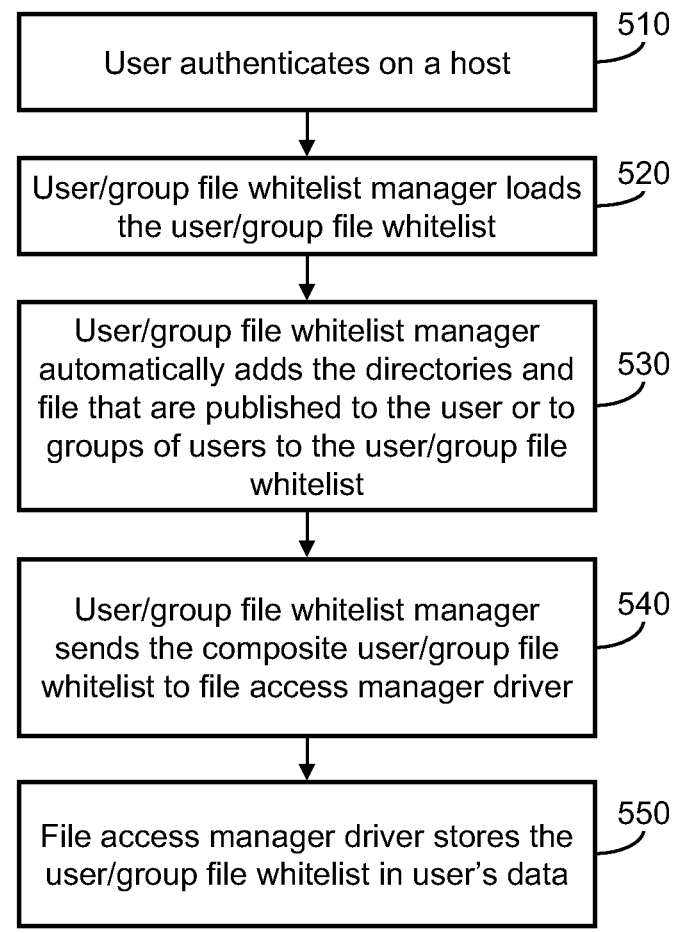
FIG. 5 illustrates a flow diagram of a method of initializing user-specific and group-specific access and/or visibility to computer directories and files, according to the present disclosure.

FIG. 5 illustrates a flow diagram of a method 500 of initializing user-specific and group-specific access and/or visibility to directories and files of computer 100, and more particularly of passing user/group file whitelist 170 to file access manager driver 128 at the time that a user/group 190 logs on to a session. Method 500 may include, but is not limited to, the following steps.

At step 510, a certain user 190 is authenticated with computer 100. This step may include a username and password check or other type of conventional or novel authentication known to one of skill. This step generally assumes that the list of allowable users has been predetermined for computer 100 and is accessible from storage.

At step 520, user/group file whitelist manager 174 reads into memory (not shown) of computer 100 the list of allowable directories and files contained in user/group file whitelist 170 that are associated with the authenticated user 190 and any groups of which the user belongs. The allowable directories and files may be read from a file into a data structure that can be quickly searched, such as an array list.

At step 530, based on information that is published in method 300 of FIG. 3, user/group file whitelist manager 174 automatically adds any directories and files that are published to the authenticated user 190 to the contents of user/group file whitelist 170. This also includes automatically adding directories and files that are published to any groups of which the authenticated user 190 is a member. For example, on Windows computers, the list of published directories and files may be obtained by searching directories within the user's user profile for shortcuts to files.

At step 540, user/group file whitelist manager 174 transmits the composite user/group file whitelist 170, which contains the user-specific list of allowable directories and files, to file access manager driver 128. Thus, the user/group list of allowable directories and files exists in kernel-mode address space 120.

At step 550, file access manager driver 128 stores user/group file access whitelist 170 in user data 132 of the authenticated user 190. User data 132 resides at file access manager driver 128.

The benefits of initialization method 500 include bringing user/group file whitelist 170 into kernel-mode address space 120, where it can be accessed with high efficiency during user-specific file access and file visibility enforcement methods.

Figure 6:
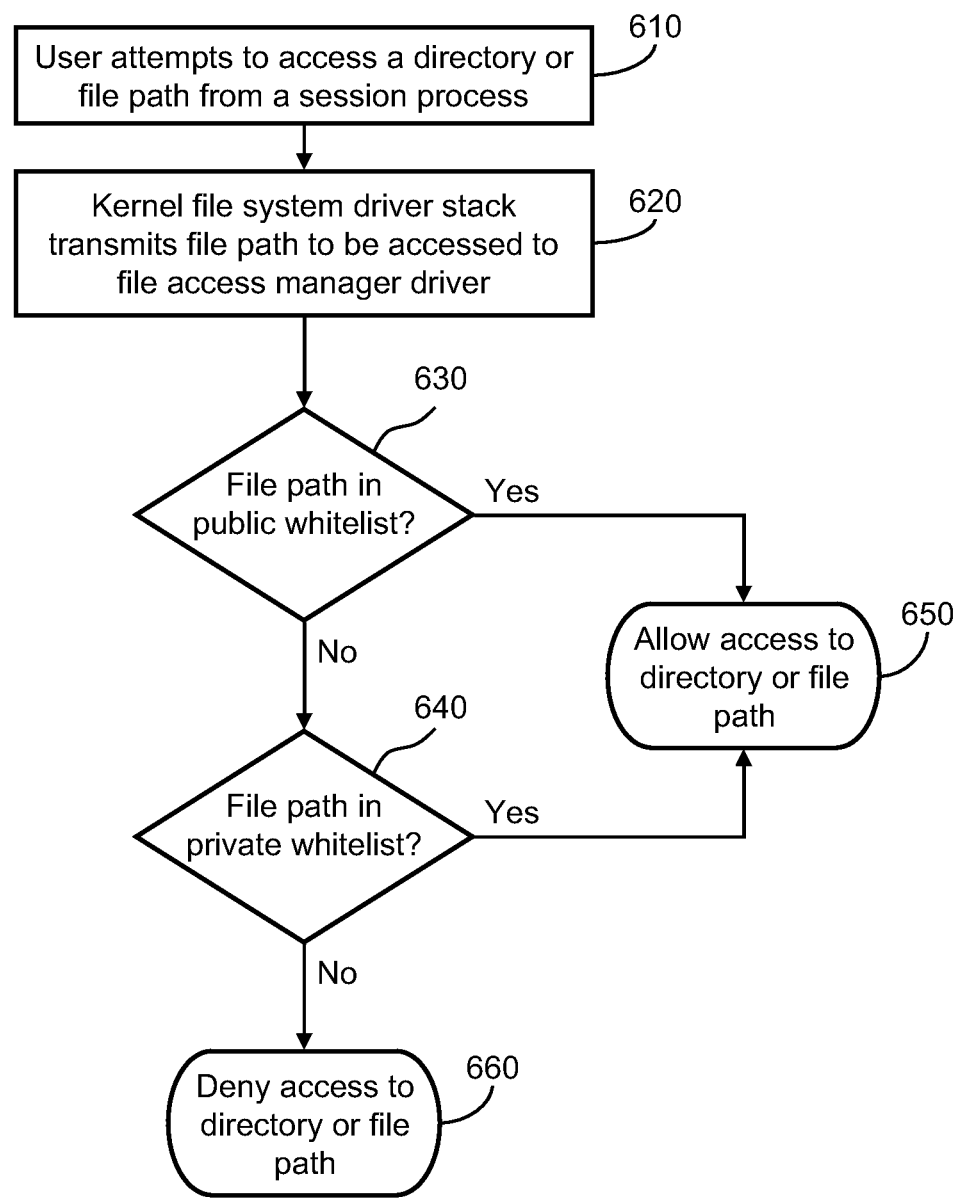
FIG. 6 illustrates a flow diagram of a method of enforcing access restrictions and/or visibility restrictions to computer directories and files, according to the present disclosure.

FIG. 6 illustrates a flow diagram of a method 600 of enforcing public and private access and/or visibility to directories and files of computer 100. More particularly, method 600 is an example of a method of controlling user access and/or visibility to directories and files of a computer. Method 600 may include, but is not limited to, the following steps.

At step 610, an authenticated user 190 attempts to access a directory or file path of computer 100 by initiating one of session processes 154. For example, the session process may be a word processing program, such as Microsoft Word® and the directory or file may be a document the user wishes to edit.

At step 620, kernel file system driver stack 124 transmits directory or file path to be accessed to file access manager driver 128. Continuing the example of Microsoft Word®, kernel file system driver stack 124 transmits the file path "C:\Program Files\Microsoft Office\OFFICE11\WINWORD.EXE" to file access manager driver 128.

At decision step 630, file access manager driver 128 determines whether the directory or file path is present in public file whitelist 158. For example, file access manager driver 128 interrogates the contents of public file whitelist 158 for the requested directory or file path. Continuing the example of Microsoft Word®, file access manager driver 128 interrogates the contents of public file whitelist 158 for file path=C:\Program Files\Microsoft Office\OFFICE11\WINWORD.EXE. If the directory or file path is present, method 600 proceeds to step 650. If the directory or file path is not present, method 600 proceeds to step 640.

At decision step 640, file access manager driver 128 determines whether the directory or file path is present in user/group file whitelist 170. For example, file access manager driver 128 interrogates the contents of user/group file whitelist 170 for the requested directory or file path. Continuing the example of Microsoft Word®, file access manager driver 128 interrogates the contents of user/group file whitelist 170 for file path=C:\Program Files\Microsoft Office\OFFICE11\WINWORD.EXE. If the directory or file path is present, method 600 proceeds to step 650. If the directory or file path is not present, method 600 proceeds to step 660.

According to one embodiment, public file whitelist 158 and user/group file whitelist 170 are both stored in kernel space memory. Decision steps 630 and 640 may include iterating through entries in both whitelists and, for each allowable file path entry, checking as to whether the directory or file path matches the entry. In embodiments in which the list of allowable directories and file paths is stored in any one of a plurality of formats (e.g., a file name, a directory name), checking may include a format-specific step, such as comparing file name strings, and/or iterating through a directory and comparing file name strings found therein. The iteration may return a Boolean true if the allowable process is found, otherwise returning false.

At step 650, having determined that the directory or file path is in either the public file whitelist 158 or user/group file whitelist 170, file access manager driver 128 allows the user/group 190 access to the directory or file path. That is, the access request is passed to the next driver in kernel file system driver stack 124.

At step 660, having determined that the directory or file path is not present in any whitelist, file access manager driver 128 denies the user/group 190 access and/or visibility to directory or file path. That is, an access request failure is returned to kernel file system driver stack 124.

Figure 7A:
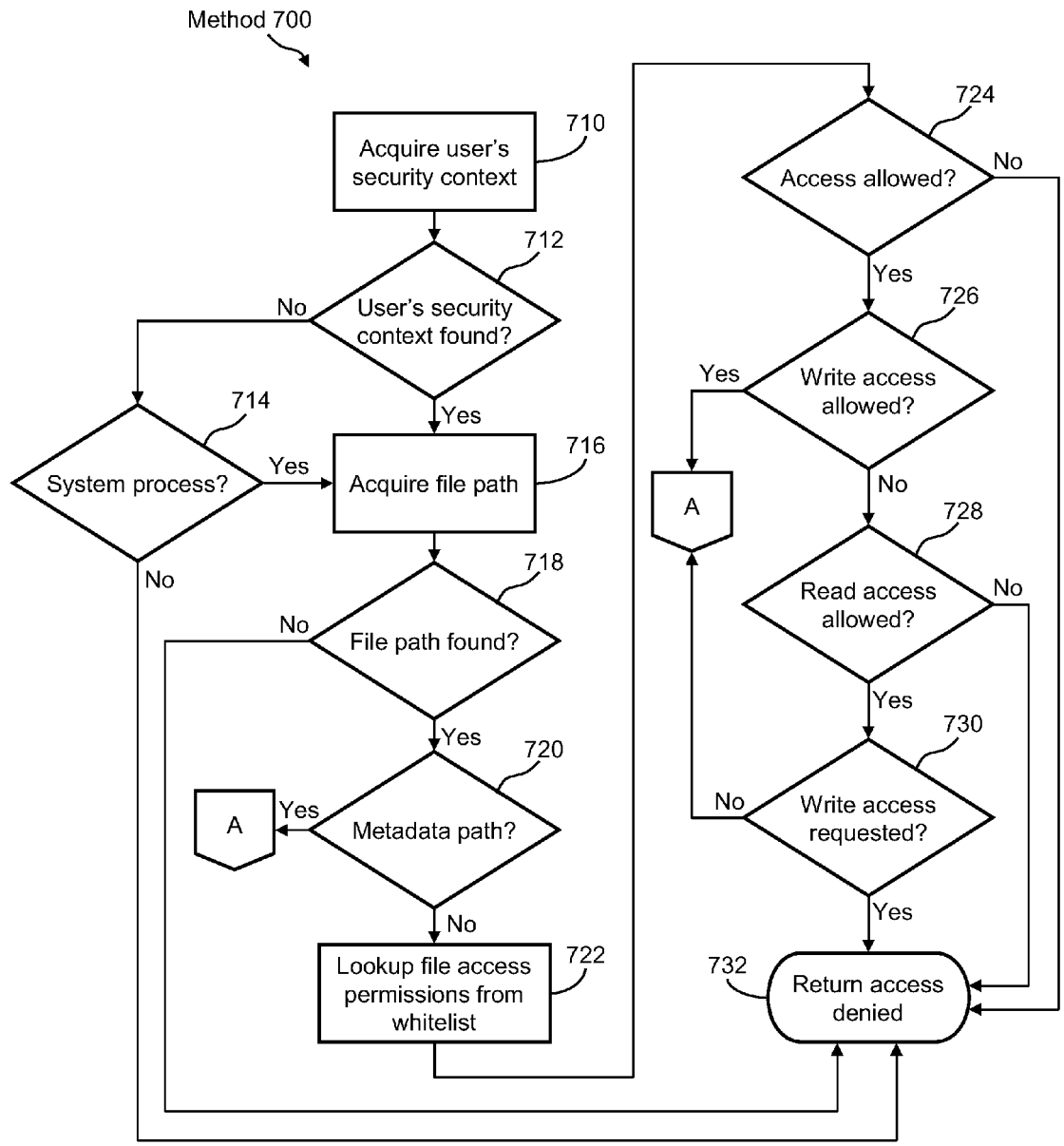
FIGS. 7A and 7B illustrate a flow diagram of an example of a method of processing an access and/or visibility request, according to the present disclosure.
Figure 7B:
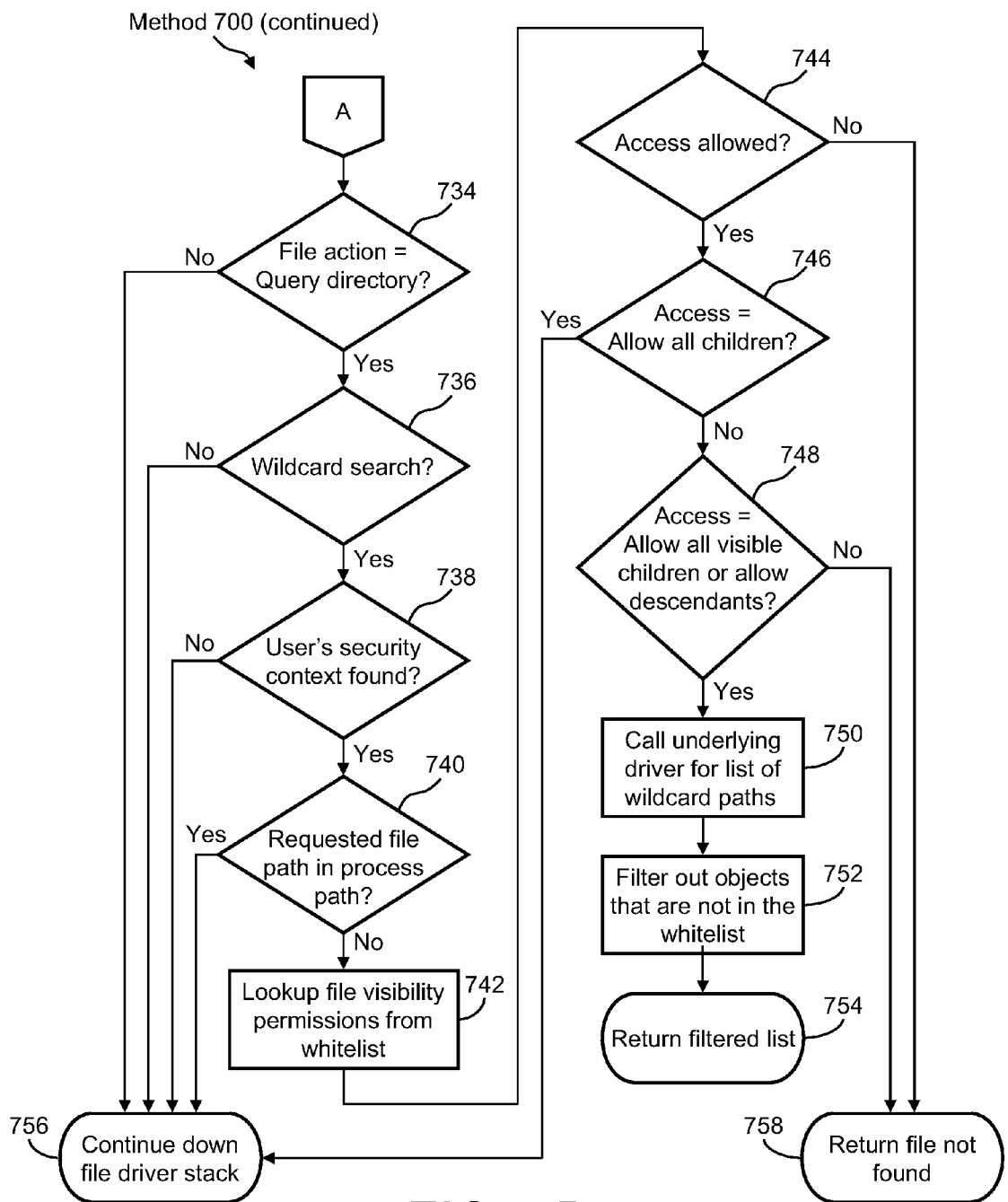

FIGS. 7A and 7B illustrate a flow diagram of an example of a method 700 of processing an access and/or visibility request from kernel file system driver stack 124 to file access manager driver 128 for a specific user 190. The steps 710 through 732 of method 700 (see FIG. 7A) are related to directory and/or file access restrictions, whereas the steps 734 through 758 of method 700 (see FIG. 7B) are related to directory and/or file visibility restrictions. Method 700 may include, but is not limited to, the following steps.

At step 710, file access manager driver 128 acquires from OS 110 the security context of the specific user/group 190 who has initiated the request in order to apply the proper restrictions for the specific user/group 190. The security context (or security identifier) includes information for uniquely identifying each user/group 190, which exists as a result of the user login and authentication process. The security context is used to determine what directories and files the specific user/group 190 has been granted rights to access.

At decision step 712, file access manager driver 128 determines whether the security context of the specific user/group 190 is found. That is, it is determined whether the specific user/group 190 has been successfully identified. If the user's security context is found, method 700 proceeds to step 716. However, if the user's security context is not found, method 700 proceeds to decision step 714.

At decision step 714, file access manager driver 128 determines whether the request pertains to a system process, meaning any process that is not initiated in the user's session. The Windows Remote Procedure Call Service, rpcss.exe, is an example of such a process. If the process is not initiated in the user's session, then it is a system process and method 700 proceeds to step 716. However, if the process is initiated in the user's session, then it is not a system process and method 700 proceeds to step 732.

At step 716, file access manager driver 128 acquires the directory or file path associated with the request. That is, file access manager driver 128 interrogates the contents of both public file whitelist 158 and user/group file whitelist 170 for the requested directory or file path.

At decision step 718, file access manager driver 128 determines whether the directory or file path exists in the contents of either public file whitelist 158 or user/group file whitelist 170. If the directory or file path is found, method 700 proceeds to decision step 720. However, if the directory or file path is not found, method 700 proceeds to step 732.

At decision step 720, file access manager driver 128 determines whether the file path is a metadata path. Certain file paths of a computer are used exclusively by the computer's OS. An example of such a file path is a metadata path. If the file path is a metadata path, method 700 proceeds to step 734. However, if the file path is not a metadata path, method 700 proceeds to step 722.

At step 722, file access manager driver 128 interrogates user/group file whitelist 170 for the directory and/or file access permissions for the specific user/group 190.

At decision step 724, file access manager driver 128 determines whether the directory and/or file access permissions for the specific user/group 190 are present in user/group file whitelist 170. That is, file access manager driver 128 determines whether directory and/or file access is allowed for the specific user/group 190. If assess is allowed, method 700 proceeds to decision step 726. However, if assess is not allowed, method 700 proceeds to step 732.

At decision step 726, based on information in user/group file whitelist 170, file access manager driver 128 determines whether write access is allowed of the directory and/or file for the specific user/group 190. If write assess is allowed, method 700 proceeds to decision step 734. However, if write assess is not allowed, method 700 proceeds to decision step 728.

At decision step 728, based on information in user/group file whitelist 170, file access manager driver 128 determines whether read access is allowed of the directory and/or file for the specific user/group 190. If read assess is allowed, method 700 proceeds to decision step 730. However, if read assess is not allowed, method 700 proceeds to step 732.

At decision step 730, file access manager driver 128 determines whether the specific user/group 190 is requesting write access to the directory and/or file. If write access is requested, method 700 proceeds to step 732. However, if write access is not requested, method 700 proceeds to decision step 734.

At step 732, the request for access is denied and a failure is returned to kernel file system driver stack 124. The request is not passed to the next file driver in kernel file system driver stack 124.

At decision step 734, file access manager driver 128 determines whether the file action is a "query directory" function. That is, whether the specific user/group 190 is requesting visibility to directories and/or files paths. If a "query directory" function, method 700 proceeds to decision step 736. However, if not a "query directory" function, method 700 proceeds to step 756.

At decision step 736, file access manager driver 128 determines whether the request is a wildcard search. There are cases in which a given process will perform a "query directory" function in order to acquire a listing of files that are stored in the same directory as the application's executable file. Generally, an application cannot run if it is unable to query the files that are in the same directory in which its executable file is located. An aspect of the invention is that it allows applications to be published to a user without requiring an administrator to specifically grant access to the directories that contain the application's executable file. This step is used to automatically grant these permissions by allowing directory queries that are not a wildcard search. If a wildcard search, method 700 proceeds to decision step 738. However, if not a wildcard search, method 700 proceeds to step 756.

At decision step 738, again file access manager driver 128 determines whether the security context of the specific user/group 190 is found. That is, it is determined whether the specific user/group 190 has been successfully identified. If the user's security context is found, method 700 proceeds to decision step 740. However, if the user's security context is not found, it is likely a system request and method 700 proceeds to step 756.

At decision step 740, file access manager driver 128 determines whether the requested file path is in the same directory as the executable file of the process or application. This is another step in which access and/or visibility to directories or files that are in the directory of the process or application that is running is automatically granted to the specific user/group 190. If the requested file path is in the directory of the process or application, method 700 proceeds to step 756. However, if requested file path is not in the directory of the process or application, method 700 proceeds to step 742.

At step 742, file access manager driver 128 interrogates user/group file whitelist 170 for the directory and/or file visibility permissions for the specific user/group 190.

At decision step 744, file access manager driver 128 determines whether the directory and/or file visibility permissions for the specific user/group 190 are present in user/group file whitelist 170. That is, file access manager driver 128 determines whether directory and/or file visibility is allowed for the specific user/group 190. If visibility is allowed, method 700 proceeds to decision step 746. However, if visibility is not allowed, method 700 proceeds to step 758.

At decision step 746, based on information in user/group file whitelist 170, file access manager driver 128 determines whether the visibility permissions for the specific user/group 190 includes "allow all children." "Children" are any files and directories contained within the specified directory. That is, whether the specific user/group 190 is allow visibility to all children (e.g., sub-directories and files) contained in the specified directory or file path. If visibility to all children is allowed, method 700 proceeds to step 756. However, if visibility to all children is not allowed, method 700 proceeds to decision step 748.

At decision step 748, based on information in user/group file whitelist 170, file access manager driver 128 determines whether the visibility permissions for the specific user/group 190 includes "allow all visible children or allow descendants." "Descendants" are any files and directories whose paths contain the path to the specified directory. If visibility to all children or descendants is allowed, method 700 proceeds to step 755. However, if visibility to all children or descendants is not allowed, method 700 proceeds to step 758.

At step 750, because the specific user/group 190 is allowed visibility to all children or descendants (at steps 746 and 748), the underlying driver is called for a list of the wildcard paths. That is, the request is forwarded to the next file driver in kernel file system driver stack 124 and full list of children of the requested directory is returned to file access manager driver 128.

At step 752, objects that are not in user/group file whitelist 170 are filtered out. That is, any objects not contained in user/group file whitelist 170 are removed.

At step 754, the filtered list is returned to file access manager driver 128.

At step 756, the request is passed to the next file driver in kernel file system driver stack 124.

At step 758, the request for visibility access is denied and, for example, a "file not found" message is returned to kernel file system driver stack 124. The request is not passed to the next file driver in kernel file system driver stack 124.

What is claimed is:

1. A method for controlling user access to directories and files of a computer, the method comprising:
    storing a plurality of file whitelists in memory, wherein each file whitelist identifies one or more users and one or more files accessible by the users;
    executing instructions stored in memory, wherein execution of the instructions by a processor:
        determines that an administrator has performed an act of publishing one or more previously unpublished files, wherein the act of publishing specifies that the previously unpublished files are to be published to one or more users, and
        identifies which of the plurality of file whitelists are associated with the specified users; and
    automatically adding, based on the act of publishing to the specified users, the previously unpublished files to one or more file whitelists identified as being associated with the specified users, wherein the identified file whitelists are updated with the previously unpublished files.

2. The method of claim 1, wherein the stored file whitelists comprise file whitelists specific to a single user.

3. The method of claim 1, wherein the stored file whitelists comprise file whitelists specific to a group of one or more users.

4. The method of claim 1, wherein the stored file whitelists comprise a public file whitelist that identifies files accessible to all users.

5. The method of claim 1, wherein the stored file whitelists comprise at least one file whitelist that identifies the associated one or more files as a directory of files.

6. The method of claim 1, wherein the stored file whitelists comprise at least one file whitelist that identifies the associated one or more files by reference to a blacklist of restricted files, wherein the associated one or more files are identified as files not on the blacklist.

7. The method of claim 1, wherein the specified one or more users are identified by reference to a group of one or more users, and wherein the identified file whitelists are specific to the group.

8. The method of claim 7, further comprising identifying file whitelists specific to each user in the group and automatically adding the previously unpublished files to the identified file whitelists specific to each user in the group.

9. An apparatus for controlling user access to directories and files of a computer, the apparatus comprising:
    memory for storing a plurality of file whitelists, wherein each file whitelist identifies one or more users and one or more files accessible by the users;
    a processor for executing instructions stored in memory, wherein execution of the instructions by the processor:
        determines that an administrator has performed an act of publishing one or more previously unpublished files, wherein the act of publishing specifies that the previously unpublished files are to be published to one or more users, and
        identifies which of the plurality of file whitelists are associated with the specified users,
    wherein the one or more file whitelists identified as being associated with the specified users stored in memory are updated by automatic addition, based on the act of publishing to the specified users, of the previously unpublished files.

10. The apparatus of claim 9, wherein the stored file whitelists comprise file whitelists specific to a single user.

11. The apparatus of claim 9, wherein the stored file whitelists comprise file whitelists specific to a group of one or more users.

12. The apparatus of claim 9, wherein the stored file whitelists comprise a public file whitelist that identifies files accessible to all users.

13. The apparatus of claim 9, wherein the stored file whitelists comprise at least one file whitelist that identifies the associated one or more files as a directory of files.

14. The apparatus of claim 9, wherein the stored file whitelists comprise at least one file whitelist that identifies the associated one or more files by reference to a blacklist of restricted files, wherein the associated one or more files are identified as files not on the blacklist.

15. The apparatus of claim 9, wherein the specified one or more users are identified by reference to a group of one or more users, and wherein the identified file whitelists are specific to the group.

16. The apparatus of claim 15, wherein the processor executes further instructions to identify file whitelists specific to each user in the group and automatically add the previously unpublished files to the identified file whitelists specific to each user in the group.

17. A non-transitory computer-readable storage medium, having embodied thereon a program executable by a processor to perform a method for controlling user access to directories and files of a computer, the method comprising:
    storing a plurality of file whitelists, wherein each file whitelist identifies one or more users and one or more files accessible by the users;
    determining that an administrator has performed an act of publishing one or more previously unpublished files, wherein the act of publishing specifies that the previously unpublished files are to be published to one or more users;
    identifying which of the plurality of file whitelists are associated with the specified users; and
    automatically adding, based on the act of publishing to the specified users, the previously unpublished files to one or more file whitelists identified as being associated with the specified users, wherein the identified file whitelists are updated with the previously unpublished files.

* * * * *